Patented May 12, 1953

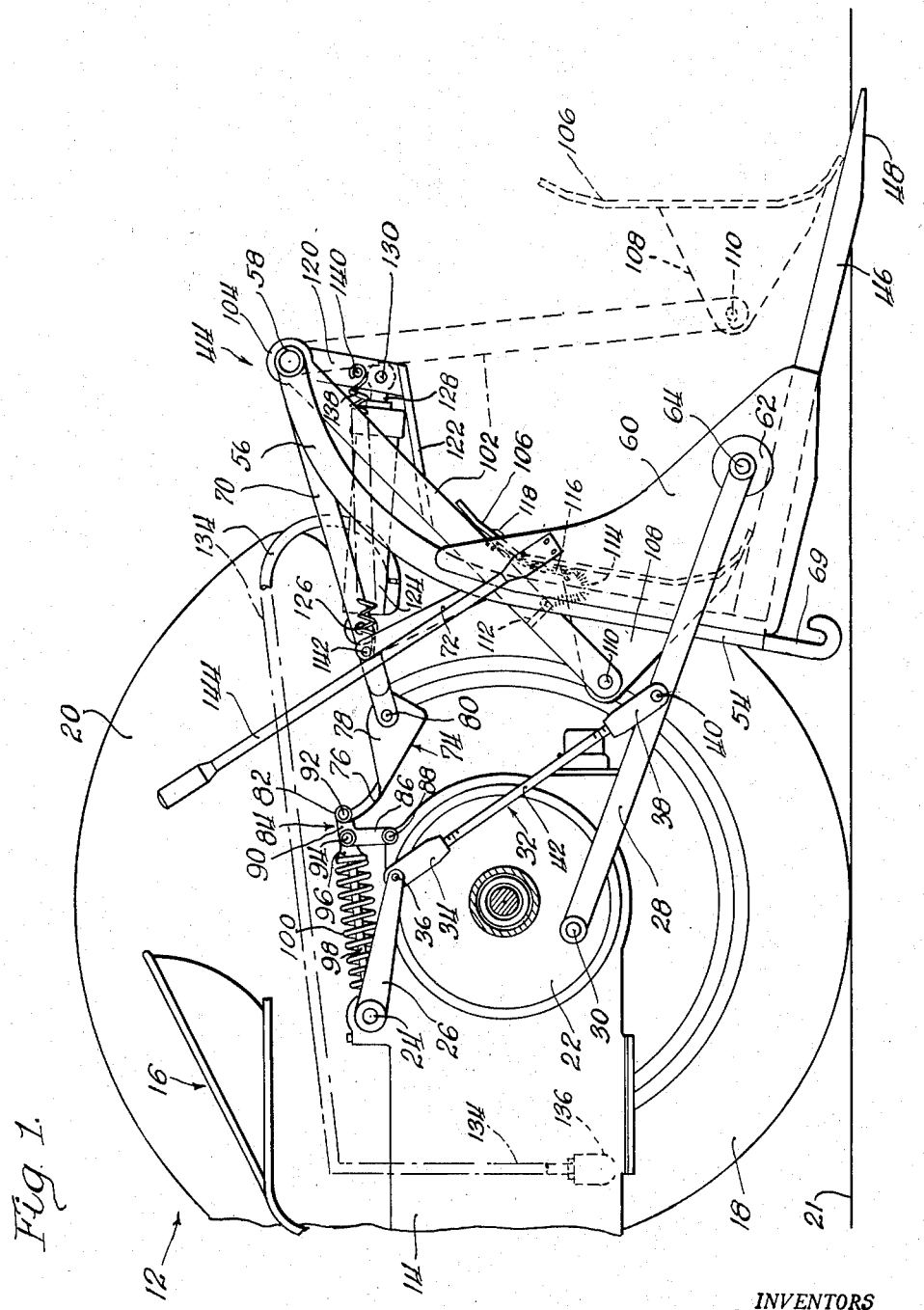

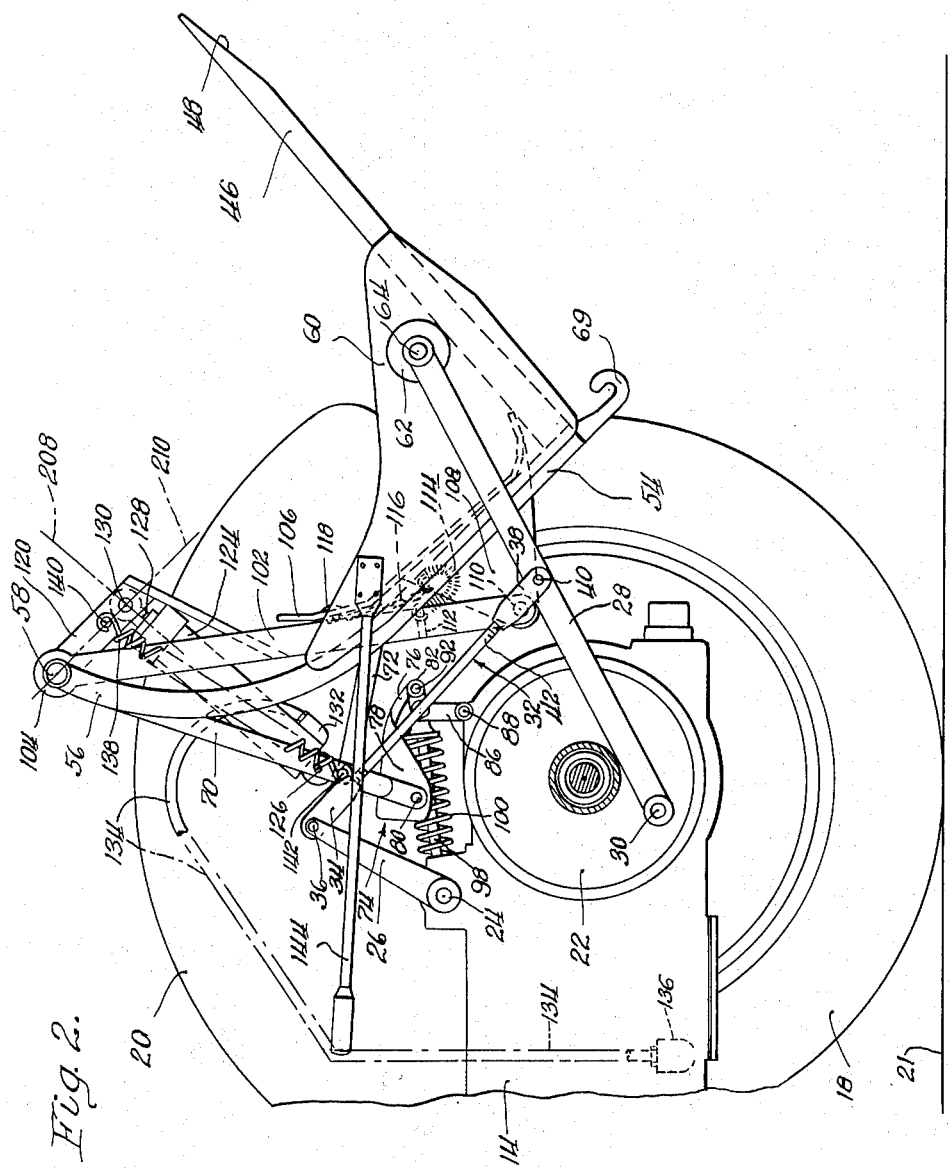

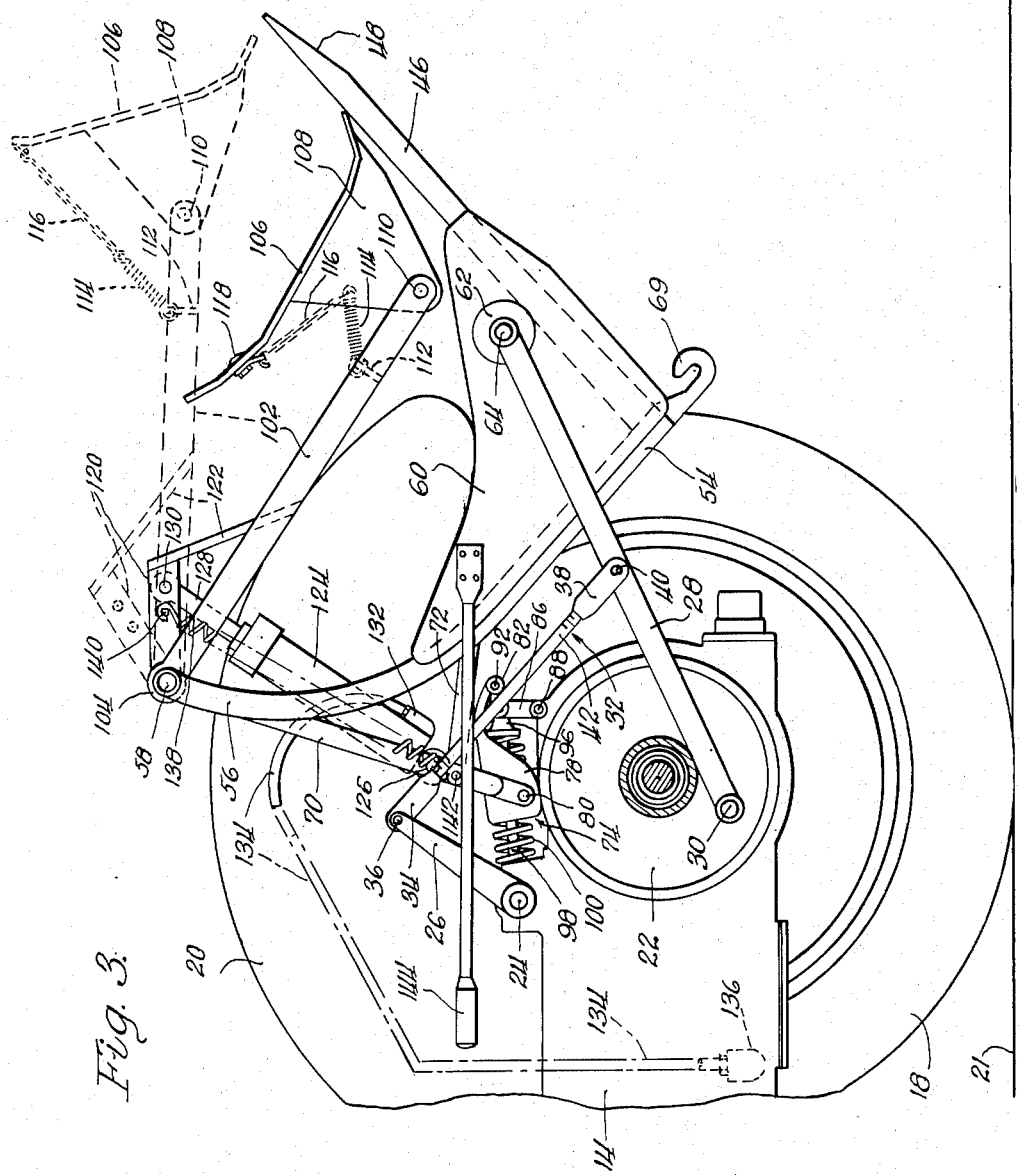

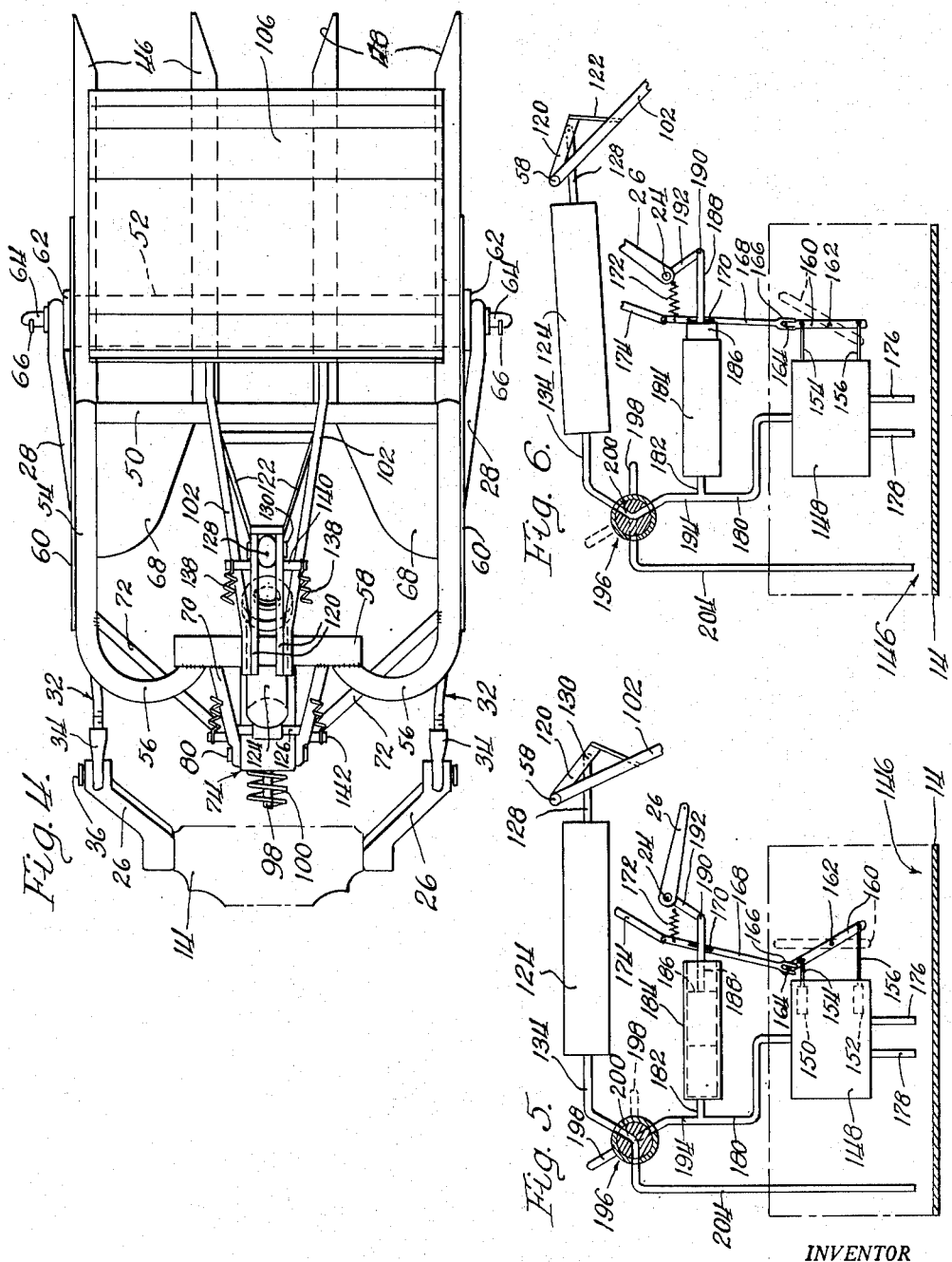

2,638,237

UNITED STATES PATENT OFFICE 2,638,237

CONTROL FOR TRACTOR MOUNTED MANURE LOADERS

Donald K. Struthers and George W. Schroeder, Des Moines, Iowa

Application October 24, 1947, Serial No. 781,840

4 Claims. (Cl. 214—510)

This invention relates to a tractor mounted manure loader, which tractor is provided with a hydraulic power take-off mechanism, such as provided on a Ford tractor, and more particularly to a hydraulic control for said tractor mounted manure loader. Some of the mechanical features described in this application, which features pertain to the tractor mounted manure loader, form the subject matter of our copending application, Serial No. 768,570, filed August 14, 1947, now Patent No. 2,503,522.

The device of the present invention includes a scoop adapted to be loaded and elevated by the operation of the hydraulic power take-off mechanism which is built in the tractor, and an ejector plate for ejecting the loaded material from the scoop after the latter is loaded.

An object of the present invention is the provision of an auxiliary hydraulic mechanism for operating the ejector plate.

Another object of the invention is the provision of means whereby the auxiliary hydraulic mechanism just referred to is actuated by the hydraulic power lift mechanism of the tractor.

Another object is the provision of a novel arrangement whereby the ejector plate can be actuated in any position of the scoop.

A further object of the invention is the provision of locking means for locking the scoop in elevated position, which locking means securely locks the scoop during the ejecting or unloading operation, and at the end of the ejecting operation, the locking means is moved to a position where it can be easily unlocked by the operator.

Still another object is the provision of an arrangement for preventing the breakage of the parts of the loader; this arrangement is designed to cooperate with certain features of the hydraulic power take-off mechanism which forms a standard part of the tractor. Such arrangement includes means whereby if the ejector plate should become obstructed in its operation by an obstacle lodged in the scoop, the resistance encountered is transmitted through the auxiliary hydraulic mechanism to the hydraulic power lift mechanism, the latter proceeding to a point where it automatically shuts off.

A still further object is the provision of a special arrangement of features whereby the power applied to the ejector has the most effect when the load in the scoop is the greatest and the greatest application of force is most desired.

Another object is the provision of hook means on the loader for connection thereto of a draft vehicle when the loader is raised and in position for transporting; said hook is advantageously constructed and arranged so that it can be easily connected to the draft vehicle in the raising movement of the loader.

Still another object of the invention is the provision of such a loader and operating parts that when the loader is employed to load from a pile of material, high initial break-loose force is applied to lift a load from the pile.

With these and other objects in view, our invention consists in the construction, arrangement, and combination of the various parts of our device whereby the objects contemplated are attained, as hereinafter more fully set forth, pointed out in the claims, and illustrated in the accompanying drawings, wherein:

Figure 1 is a side elevational view of the loader of the present invention applied to a tractor, the tractor being shown only partially;

Figure 2 is a view similar to Figure 1 with the loader elevated to its uppermost position;

Figure 3 is a view similar to Figure 2 with the loader in locked position which it assumes after reaching the position of Figure 2, and showing the ejector plate in different positions of unloading;

Figure 4 is a plan view of the loader in the position of Figure 3, the tractor being omitted except for a small portion of the frame;

Figure 5 is a diagrammatic view of the hydraulic power take-off mechanism of the tractor, and the auxiliary hydraulic ram of the loader, in the positions assumed when the loader is in the position of Figure 1; and Figure 6 is a view similar to Figure 5 showing the hydraulic mechanisms in the positions when the loader is in the position of Figure 3.

Referring now in detail to the drawings, a tractor 12 is represented by a portion of the rear thereof showing the parts essential for operation of the loader. The tractor 12 includes a frame 14 upon which is mounted a seat 16 which serves as an operator's station at the rear of the tractor. The tractor includes rear wheels 18, the near one of which is removed for purposes of illustration, and fenders 20. The ground or other supporting surface is indicated by the line 21.

The rear portion of the frame 14 of the tractor includes a differential housing 22 in which is supplied lubricating oil in the usual manner. This fact is referred to for purposes of later explaining the action of the hydraulic power take-off mechanism of the tractor which derives its hydraulic fluid from the differential housing 22. The pump for the power take-off mechanism is included in the frame 14 and its detail operation insofar as it affects the action of the loader of the present invention will be explained in detail later.

A shaft 24 is journaled in the upper part of the housing 14 and is provided with means for rocking by the hydraulic power take-off mechanism. Fixedly secured to the shaft 24, outwardly of the frame, are a pair of power lift arms 26, one on either end of the shaft 24. The power lift arms 26 normally extend to the rear of the tractor, or to the right as illustrated, and are adapted to be raised and lowered upon rocking of the shaft 24.

A pair of supporting links 28 are pivoted at pivot points 30, one on either side of the differential housing 22 adjacent the lower portion of the latter. Interconnecting the power lift arms 26 and the supporting links 28 are connecting links 32, each of which comprises an upper adaptor 34 pivoted at 36 to the outer swinging end of the respective power lift arms 26; a lower adaptor 38 is pivoted at 40 to the respective supporting link 28 intermediate the ends of the latter; a rod 42, which in the present instance is preferably a rigid link, is threaded into the adaptors 34 and 38, being adjustable therein for lengthening and shortening the links 32 as a whole.

The loader proper of the present invention is indicated as a whole at 44 and is mounted on the rear of the tractor in rear of the frame 14 thereof and generally between the rear wheels 18. All references to directions in the present instance will be as oriented with the directions of the tractor, that is, forward is to the left or toward the front of the tractor and rearward is to the right or to the rear of the tractor.

The loader 44 includes a plurality of prongs or teeth 46 spaced horizontally in a common plane and extending rearwardly. The rear ends of the teeth 46 are provided with tapered portions 48 for facilitating penetration thereof into a pile of material which is intended to be loaded. The teeth terminate forwardly adjacent a cross member 50 to which the teeth are rigidly secured as by welding. An additional cross piece 52 is rigidly secured to the teeth intermediate the ends of the latter forming a rigid assembly of teeth. The teeth 46 thereby form the floor or the bottom of the loader. The spaced teeth 46 are effective and convenient for loading manure, but if other materials are to be handled, such as grain or soil, the teeth may be covered with a solid sheet of steel to form a closed bottom, forming a shovel.

Extending upwardly from the forward ends of the teeth 46 and positioned at the outermost teeth are a pair of upwardly extending rigid members or braces 54. The braces 54 are rigidly secured to the cross piece 50 and the outermost teeth 46 as by welding, and extend generally perpendicularly upwardly from the floor of the loader for a portion of their height and at the upper part thereof curve rearwardly and inwardly as indicated at 56. The upper ends of the braces 54 are rigidly secured as by welding to a cross piece 58 which serves not only as a brace for the upper ends of the braces 54 but also as a pivot support for certain operating parts of the loader.

A pair of side plates 60 are secured, one on each side of the loader, to the respective outermost tooth 46 and the brace 54 as by welding. The side plates 60 extend rearward and upward only a portion of the distances of the loader. Secured to the outer surface of each side plate 60 is a reinforcing bearing plate 62 to which is secured an outwardly extending stud 64. The studs 64 are adapted to be inserted in holes in the outermost or swinging ends of the supporting links 28. Thereafter, securing means, such as cotter keys 66, are secured in the studs 64 for retaining the outer ends of the supporting links 28 thereon. The studs 64 will also be referred to as pivot points between the loader and the supporting links 28.

Plates 68 are secured to the loader, as by welding, to the cross piece 50 and the upwardly extending braces 54 to form a partial front wall of the loader. These plates 68 also serve to maintain the rigidity of the loader as a whole. That portion of the loader proper which has thus far been described will also be referred to as a scoop.

A hook 69 is rigidly secured to the cross piece 50 and extends downwardly therefrom. The open end of the hook 69 is directed rearwardly of the loader for connection with the tongue of a draft vehicle.

Secured rigidly to the cross member 58, as by welding, are a pair of laterally spaced braces or reinforcing members 70. These braces 70 extend forwardly and downwardly. Additional reinforcing members 72 are secured as by welding to respective ones of the braces 70 and extend rearwardly and diverge outwardly where their rear ends are secured to the upwardly extending braces 54 as by welding.

A guide link or locking link referred to as a whole at 74 is the means for connecting the upper portion of the loader or scoop to the tractor frame. The details of construction, operation, and function of the guide link 74 are fully disclosed in our copending application referred to above. However, the guide link 74 performs certain additional functions in the present invention, and its construction and operation will be referred to herein for the purpose of bringing out the operation of the present loader.

The guide link 74 includes a longitudinally extending flat portion 76 from which extend a pair of laterally spaced wings 78 extending generally perpendicular to the plane of the portion 76. The wings 78 are pivoted to braces 70 by means of studs 80. The longitudinal portion 76 of the guide link 74 extends beyond the wings 78 (to the left in Figure 1) and is provided with a bearing 82 having a transverse opening therein.

A link 84 has one leg 86 pivoted on the frame 14 of the tractor at 88 adjacent the rear thereof and substantially at the top of the differential housing 22. The other leg 90 extends rearwardly and is pivoted at 92 by a convenient bearing pin in the bearing 82 of the guide link 74. The guide link 74 is thereby free to pivot about the point 92. Secured in the link 84 at the point 94 is an adaptor 96 which in turn is secured to a rod 98 extending into the tractor frame 14. A compression spring 100 surrounds the rod 98 and is biased between the adaptor 96 and the frame 14 of the tractor. The link 84 and the rod 98 and spring 100 form portions of the standard equipment of the tractor and form convenient means for mounting of the loader.

A pair of arms 102 are pivoted on the cross piece 58 and positioned inwardly of the braces 70 and spaced laterally apart from each other. The arms 102 may be provided with enlargements 104 or any other convenient means to form bearing portions for supporting the arms on the cross piece or bearing support 58. The arms 102 in the construction shown are, of course, inserted or placed on the cross piece 58 before securement of the braces 70 and 54. As illustrated in Figure 1, the arms 102 extend downwardly and somewhat forwardly out of the forward end of the scoop and between the rear plates 68.

An ejector plate 106 is provided with a pair of rearwardly extending plates 108 which are provided with studs or bearing members 110. The studs 110 are received in holes in the lower ends of the arms 102. The ejector plate 106 extends transversely across the width of the scoop or loader and as illustrated in Figure 1 is positioned between the side plates 60. The ejector plate is straight transversely across the scoop and may be curved or bent rearwardly at its top and bottom. In the position of the arms 102 as shown in Figure 1, the ejector plate 106 is positioned closely adjacent the front end of the loader and is disposed generally perpendicular to the plane of the bottom of the scoop. The ejector plate 106 in its foremost position abuts or contacts the front of the loader.

A cross piece 112 is secured between the arms 102 adjacent the lower ends thereof and above the plates 108. A spring 114 has one end secured to the cross piece 112, and its other end secured to a chain or other flexible connecting member 116, the opposite end of the latter being connected to the ejector plate 106 adjacent the upper portion thereof.

A pair of stub arms 120 are pivoted to the cross piece 58, and angled rearwardly with respect to the arms 102. Brace members 122 are secured to the outer ends of the stub arms 120 and to the arms 102. The braces 122 are secured as by welding, rendering the stub arms 120 rigid with the arms 102, the stub arms 120 being free to pivot about the cross member 58 in the swinging movements of the arms 102.

An auxiliary hydraulic ram is shown at 124. The ram is pivoted on a pin or rod 126 supported by and between the brace members 70. The ram 124 extends generally rearwardly and the extensible member or plunger 128 of the ram is pivoted at 130 in and between the stub arms 120. The ram 124 is provided with a fluid connection portion 132 to which is connected a hose or other line 134. The line 134 extends forwardly where it extends into the frame at 136 and connects with the hydraulic power take-off mechanism in a manner to be explained later.

One or more tension springs 138 are connected at one end at 140 with the stub arms 120, and at the other ends with the brace member 70, as indicated at 142. A handle 144 is rigidly secured to one of the side plates 60, and extends forwardly in such a direction that the outer end thereof is adjacent the operator's station 16 when the loader is in elevated position illustrated in Figures 2 and 3.

Referring to Figures 5 and 6, the operation of the hydraulic power take-off mechanism of the tractor, insofar as it affects the operation of the loader, will now be described.

As mentioned above, the lubricating fluid inserted in the differential housing 22 forms the hydraulic fluid for the power take-off mechanism. The oil in the differential housing partially fills the lower portion of the rear end of the casing 14, a sump is thereby formed, which is referred to diagrammatically at 146. A hydraulic pump 148 is positioned in the casing 14 in the sump 146. The pump 148 is constantly operated by the motive power of the tractor. The pump is provided with control valves 150 and 152 which are provided with stems 154 and 156, respectively, extending out of the pump. The outer ends of the stems 156 are connected to a lever or valve arm 160 which is pivoted at 162 in the frame 14 of the tractor. The valve arm 160 is adapted to be rocked about the pivot point 162 to various positions, two of which are shown in Figure 5; the full line position will be referred to for convenience as the raising position. The position shown in dotted lines in Figure 5 will be referred to as the neutral position. The upper end of the valve arm 160 is provided with an extension having a pin 164 which is received between the prongs of a fork 166 formed on the lower end of a fork arm 168. Toward the upper end of the fork arm 168 is a projection 170 extending out from the side of the arm. Above the projection 170 is a compression spring 172 biased between the arm 168 and the frame 14 of the tractor. The fork arm 168 is disposed within the interior of the frame 14, and an operating handle 174 extends outwardly of the frame in a position adjacent the operator's station in the tractor.

The pump 148 is provided with an intake 176 and an outlet 178, both communicating with the sump 146. It will be understood that the intake 176 and the outlet 178 are shown diagrammatically and may be merely openings in the pump since the pump is immersed in the fluid or oil in the sump. A delivery line 180 leads from the pump 148 and has a portion 182 leading to and communicating with what will be called the main tractor ram 184. The ram 184 is provided with a piston 186 from which a connecting rod 188 leads outwardly. The outer end of the connecting rod 188 is pivoted at 190 to a lever arm 192, fixedly secured to the shaft 24 referred to above and to which are secured the power lift arms 26. When the piston 186 is extended out of the ram 184, the shaft 24 is rotated counterclockwise and the power lift arms 26 are elevated.

The foregoing portion of the hydraulic mechanisms just described are a standard part of the tractor and form a part of the power take-off mechanism. For operation of the loader of the present invention, the auxiliary ram 124 referred to above is connected to the power take-off mechanism and is included in the present diagram. A fluid line 194 is connected with the line 180 and leads to a three-branch or two-position valve 196. The valve 196 is a conventional valve including an operating handle 198 and a passage 200 therethrough. The hose or fluid line 134, referred to above, leads from the valve 196 to the auxiliary ram 124. It will be recalled that the extensible member 128 of the ram 124 is pivoted at 130 in the stub arms 120 which are rigidly secured to the arms 102, a portion of which are included in Figures 5 and 6. Another fluid line 204 leads from the valve 196 to and communicates with the sump 146.

The description in connection with Figure 5 substantially covers Figure 6, but Figure 6 shows another position of the valve arm 160. The full line position of the valve arm 160 in Figure 6 is the neutral position which is the same as the dotted line position in Figure 5; the dotted line position of the valve arm 160 in Figure 6 will be referred to as the lowering position.

Use and operation

Referring to Figure 1, it will be noted that the loader or scoop 44 is in its lowered position. In this position, the outer ends of the teeth 46 are indicated below the level of the supporting surface or ground 24. The purpose of this illustration is to indicate that the teeth are adapted to entirely reach the ground and to tend to penetrate the ground, although such penetration is seldom actually present unless the ground is loose.

The tractor with the loader attached is backed into a pile of material to be loaded. The teeth 46 penetrate the pile and when the scoop is driven a sufficient extent into the pile and the scoop is loaded, the operator actuates the hand operated lever 176 and moves the valve arm 160 from the neutral or vertical position, shown in dotted lines in Figure 5, to the raising or full line position of Figure 5. This movement opens the valves 150 and 152 so that the pump 148 pumps fluid into the main tractor ram 184. The piston 186 therein is thereby extended, which elevates the power lift arms 26 and, acting through the links 32 and supporting links 28, elevates the loader. The movement is continued from the position of the loader in Figure 1 to the position of Figure 2. In the latter figure, it will be noted that the loader in addition to being elevated is rotated about the pivot points 64 counterclockwise, so that the teeth 46 are inclined upwardly and rearwardly with respect to the tractor. The scoop thereby easily retains the material on the floor or teeth of the scoop. In the raising movements of the scoop, the guide link 74 pivots about the pivot point 92 and assumes the position illustrated in Figure 2, with the wings 76 thereof straddling the compression spring 100.

Just before the scoop reaches its uppermost raised position, the piston 186 extends out of the ram 184 and engages the stop 170 on the fork arm 168. Continued movement of the piston 186 after engaging the stop 170 moves the fork arm 168 and the valve arm 160 from the full line positions of Figure 5 to the full line positions of Figure 6. In the latter position, the valves 150 and 152 are in neutral position, that is, the pump 148 is no longer effective on the ram 184. Motion of the loader or scoop is thereby arrested. It will be noted that in the position of Figure 2, or the uppermost position of the scoop, the following points are substantially in a straight line: namely, pivot point 64 between the supporting links 28 and the scoop; pivot point 92 between the guide link 74 and the tractor frame; and pivot point 80 between the guide link 74 and the scoop. At this point equilibrium is established by the hydraulic system in the hydraulic power take-off mechanism. The valves in the hydraulic system are closed and the fluid in the various lines is prevented from passing in any direction maintaining the scoop in the position of Figure 2.

After the scoop is thus elevated and it is desired to unload the scoop, the tractor is backed to a vehicle so that the outer ends of the teeth 46 are positioned over the open top of the vehicle. Then the valve 196 is turned from the position of Figure 5 to that of Figure 6. The downward force exerted by the load is exerted through the supporting links 28, connecting links 32, and power lift arms 26, against the piston 186, forcing the piston toward retracted position into the ram. A portion of the fluid from the ram 184 is forced through the line 134 into the auxiliary ram 124. Thus, when the piston 186 is partially retracted, the weight of the load in the scoop swings the forward end of the guide link 74 downwardly to the position illustrated in Figure 3. The wings 76 of the guide link then rest on the upper portion of the differential housing 22 and solidly support the upper end of the scoop and prevent the latter from rotating further. It will be noted in this position that the pivot point 64 between the supporting links 28 and the scoop, and the pivot point 80 between the guide link 74 and the scoop, are on a line below the pivot point 92 which is the pivot point between the guide link 74 and the tractor frame. The scoop is thus locked in elevated position. This locking feature is fully covered in our copending application referred to above and that application may be referred to for further details of operation.

Upon retraction of the piston 186, the spring 172 swings the fork arm 168 and valve arm 160 from the dotted line position of Figure 5 to the full line position therein, opening the valves 150 and 152 to raising position; and since the pump 148 is constantly operating, after the valve 196 is turned to the position illustrated in Figure 6, fluid is forced through the lines 180, 194, and 134, into the auxiliary ram 124, extending the extensible element 128 in the latter. Thereupon, the stub arms 120 and thereby the arms 102 are rotated counterclockwise about the cross member 58. This rotation of the arms 102 causes the ejector plate 106 to be extended outwardly of the scoop, as best illustrated in Figure 3. The plates 108 of the ejector plate 106 have pivotal movement at 110 and the lower edge of the ejector plate 106 rests on the teeth 46. The position shown in Figure 1 of the ejector plate is its retracted position, and when the plate is extended it moves outwardly along the teeth. The full line position of the ejector plate 106 in Figure 3 shows an intermediate position and upon full extension of the auxiliary ram 124, the ejector plate 106 moves to the dotted line position in Figure 3. Throughout the movements of the ejector plate 106 from retracted position to extended position, the ejector plate is substantially perpendicular to the teeth 46, although its angle with respect thereto varies slightly from one position to the next. The equilibrium of the ejector plate 106 is maintained by the load in the scoop bearing thereagainst.

In the outermost position of the ejector plate 106, as shown in dotted lines in Figure 3, the spring 114 and chain 116 retain the ejector plate 106 from further rotation and support it in the position shown. In this position, the lower edge of the ejector plate 106 is shown slightly spaced from the outermost ends of the teeth and such spacing may be varied slightly by any desired length of the spring 114 and chain 116 and the length of the teeth 46. It is desired that the ejector plate 106 move to the outermost tip of the teeth.

The auxiliary ram 124 may be provided with a convenient stop to limit the outward movement of the extensible member 128 therein. Such stop may be merely the cap element on the end of the ram against which the piston engages when it has reached its limit of extension.

After the extensible element 128 in the auxiliary ram 124 reaches its outermost position, the force exerted in the fluid lines by the constantly operating pump 148 is thereby exerted through the main tractor ram 184 which then again extends the piston 186 therein outwardly into engagement with the stop 170 on the fork arm 168. The piston 186 thereby moves the fork arm and valve arm 160 from the full line position of Figure 5 to the full line position of Figure 6, the latter being a neutral position. The pump no longer forces fluid into the main tractor line 184, but merely operates through the intake 176 and outlet 178.

When the piston 186 is again extended as just referred to, the force of the piston 186 is again exerted through the power lift arms 26 which raises the scoop from the position of Figure 3 to the position of Figure 2, in which the guide link or locking link 74 is partially unlocked. In this position, it will be recalled that pivot points 64, 80, and 92 are substantially in a common line. The operator can then grasp the handle 144 and raise up on it, rotating the scoop clockwise about the pivot point 64. Substantially simultaneous with actuating the handle 144, the fork arm 168 is rotated by the operator from the position which it has just assumed, that is, the full line position of Figure 6, to the dotted line position of Figure 6 or to the lowering position. In the dotted line position of the valve arm 160 in Figure 6, the valves 150 and 152 are moved to a position where the fluid from the piston 184 flows reversely through the line 180 through the pump and out the outlet 178. Obviously, at the same time, the fluid from the auxiliary piston 124 reverses and flows through the line 134, valve 196, and line 194, and so on with the flow of the fluid from the ram 184 into the sump. Thus, upon retraction of the piston in the ram 184, the scoop lowers by gravity. At the same time, the tension springs 138 bias the arms 102 and the ejector plate 106 to retracted position.

In the lowering operation, the valve 196 is turned from the position of Figure 6 to the position of Figure 5, whereby fluid from the ram 124 by-passes the hydraulic power take-off mechanism and returns through the return line 204 to the sump. In the latter operation, both the lowering movement of the loader and the retracting movement of the ejector plate 106 are hastened and brought quickly back to position for additional loading operations.

The springs 138 will exhaust ram 124 at any time that valve 196 is opened to the sump through line 204. This means that the ejector plate can be returned at any time and this return is completely independent of the position of the scoop or the motion of the scoop. This feature adds to the advantages of the loader in that it speeds its operation and permits a greater degree of flexibility in operation.

The main tractor ram 184 and the auxiliary ram 124 being connected together, the reaction of either may be exerted through the other when an obstacle is encountered in operating the loader. The force per square inch required for actuating the auxiliary ram 124 is less than that required for the ram 184. Thus, if both rams are connected to the pump at the same time, the ejector plate operated by the auxiliary ram 124 will be actuated before any force takes effect on the main tractor ram 184 for raising the loader. In such a case, the weight of the loader retains the loader in lowered position, permitting the ejector plate to be moved to extended position. The dotted line position of the ejector plate 106 in Figure 1 indicated the possibility of such movement. When the ejector plate is moved to its outermost position, the stop in the auxiliary ram 124 prevents further movement, and the force of the pump 148 is then exerted through the main tractor ram 184, raising the loader. When the loader reaches its uppermost position illustrated in Figure 2, the hydraulic system is then shut off as described above.

The feature last referred to provides a safety measure of the loader preventing breakage of parts. For example, if an obstacle such as a stone were lodged between the teeth of the fork and the ejector plate is extended, the stone may be lodged so tightly that the ejector plate 106 may tend to break before it is dislodged, the reaction caused by the obstacle is transmitted to the main tractor ram 184. This ram is then extended, which elevates the scoop, raising it to the position of Figure 2 in which the fork arm 168 and valve arm 160 are moved to the position of Figure 6 or neutral position, preventing further movement of either the ejector plate 106 or the scoop. The operator can then manually remove the obstacle.

Another feature which is advantageous in the present invention is the high initial break loose force. When the scoop is backed to a pile of material and loaded, the initial force exerted in raising the scoop is mainly directed toward raising the scoop, as such, as distinguished from the force tending to rotate the scoop about the pivot point 64. In other words, the raising movement in the first part of operating the scoop is greatest compared with the rotational movement of the scoop; this movement of the scoop is utilized for breaking loose the material from the pile. After the initial movement is accomplished and the load in the scoop is broken loose from the pile, the rotational movement of the scoop becomes increasingly greater and the raising movement of the scoop becomes increasingly less. After the load is loaded onto the scoop, the raising movement or the force applied to breaking the load loose is not required to be as great.

The manner of applying force to the ejector plate is also advantageously applied. When the ejector plate is in retracted position, for example, in Figure 2, the axial line 208 through the auxiliary ram 124 is substantially perpendicular to the longitudinal line 210 through the cross member 58 and the stub arms 120. The force of the auxiliary piston 124 is applied directly to the stub arms 120 and thereby the greatest force is applied to the ejector plate 106 when the ejector plate is retracted and the load in the scoop is bearing against it. As the ejector plate is extended, and the angle between the lines 208 and 210 becomes less, and less total force is applied, but less total force is required progressively as the ejector plate 106 is extended because the load is being pushed off.

It will be apparent from the foregoing that either the scoop can be elevated or the ejector plate extended selectively and without the necessity of the other being actuated.

The draft hook 69 is arranged for most advantageous use in connection use of the loader. The hook 69 has an open portion directed generally rearwardly of the scoop and is adapted for hooking onto a draft vehicle for drawing the latter when the scoop is elevated. The hook can be hooked into an eyelet in the draft bar of the vehicle and the hooking operation accomplished by raising the loader. When the loader is raised, the open side of the hook is directed generally upwardly so that the draft tongue of the vehicle cannot easily be unhooked. The unhooking or disconnecting operation of the draft vehicle is accomplished by reverse movement or by lowering the scoop. The tractor can easily be turned in smaller areas with the draft hook thus employed, as compared with a draft hook on the frame of the tractor.

The hydraulic power take-off mechanism, such as illustrated in Figures 5 and 6, as supplied with the Ford tractor, is customarily provided with a height control. The details of such height control need not be described here but the purpose of such a height control is to enable the lift arms 26 to be raised to a predetermined point and retained there by the balance of fluid in the hydraulic system. The ejector plate 106 is also adapted to be extended to any predetermined position and maintained there by the same height control, since the auxiliary ram 124 is connected with the main tractor ram 184.

Some changes may be made in the construction and arrangement of the parts of our machine without departing from the real spirit and purpose of our invention, and it is our intention to cover by our claims such modified forms of structure or use of mechanical equivalents as may be reasonably included within their scope.

We claim as our invention:

1. A loader for a tractor having a power take-off mechanism including a continuously operating hydraulic pump, actuating fluid, and a reservoir for said fluid; said loader comprising a scoop pivotally mounted on the tractor for vertical swinging, an ejector mounted on said scoop for movement to extended and retracted position, a supply line for pressurized fluid from said pump, valve means associated with the pump, a control member for selectively actuating said valve means to permit or deny delivery of fluid from said pump to said supply line and to also permit drainage of fluid from said supply line, a first hydraulic ram connected to said supply line for raising said scoop, a second hydraulic ram connected to said supply line for operating said ejector, said hydraulic rams being connected to said supply line at spaced points with the first hydraulic ram connected at a point closer to said valve means, a two position valve in said supply line between said spaced points of connection, said valve permitting selective operative connection of said second ram to said supply line and connection of said second ram to said fluid reservoir, said first hydraulic ram being operatively associated with said control member, upon said ram raising said scoop to a predetermined height, to move said control member to a position to deny delivery of fluid to said supply line and to eliminate control of the further delivery of fluid as long as said scoop is maintained at said predetermined height, a toggle linkage operatively associated with said scoop and adapted in a first range of positions to permit swinging of said scoop and in a second range of positions to permit lowering said scoop to a locked elevated position below said predetermined height, and means for operating said loader comprising supplying pressurized fluid to said first ram, while the second ram is operatively disconnected from said supply line, to elevate said scoop to said predetermined height, whereby the delivery of further fluid is denied and whereby said toggle linkage is moved into said second range of positions, then operatively connecting said second ram to said supply line, whereby pressurized fluid from said first ram is forced into said second ram, said scoop thereby being lowered and thus restoring control of further delivery of fluid and thus moving said toggle linkage into said locked elevated position, and then supplying further pressurized fluid to said second ram to extend said ejector.

2. A loader for a tractor as set forth in claim 1, wherein said second ram is adapted to operate at a lower pressure than said first ram, the pressurized fluid then, after further extension of said second ram is halted and upon the building up of additional pressure in said supply line, serving to again extend said first ram and move said scoop to said predetermined height, whereby the delivery of further fluid is again denied, and a handle extending from said scoop, said handle affording means for tilting said scoop to move said toggle linkage into said first range of positions, and said control member affording actuating said valve means to permit drainage of fluid from said supply line to permit retraction of the ejector and lowering of the scoop.

3. A loader as set forth in claim 1 wherein said ejector is spring biased toward the retracted position.

4. A loader as set forth in claims 1 and 2 wherein said two position valve connects said second ram to said fluid reservoir after further extension of said second ram is halted, whereby subsequent drainage of the rams may be achieved in a smaller lapsed time for a complete cycle of operation.

DONALD K. STRUTHERS.
GEORGE W. SCHROEDER.

References Cited in the file of this patent

UNITED STATES PATENTS

| Number | Name | Date |
| --- | --- | --- |
| 2,397,045 | Richey | Mar. 19, 1946 |
| 2,397,046 | Richey | Mar. 19, 1946 |
| 2,409,302 | Millikin | Oct. 15, 1946 |
| 2,418,661 | Palm | Apr. 3, 1947 |
| 2,441,591 | Owen | May 18, 1948 |
| 2,503,522 | Struthers et al. | Apr. 11, 1950 |
| 2,517,582 | Lull | Aug. 8, 1950 |

FOREIGN PATENTS

| Number | Country | Date |
| --- | --- | --- |
| 124,793 | Great Britain | Apr. 10, 1919 |